UNITED STATES PATENT OFFICE.

EDWARD HART, OF EASTON, PENNSYLVANIA.

PROCESS OF EXTRACTING POTASH SALTS AND OTHER PRODUCTS FROM SILICIOUS ROCKS.

997,671.  Specification of Letters Patent.  Patented July 11, 1911.

No Drawing.  Application filed June 13, 1908.  Serial No. 438,311.

*To all whom it may concern:*

Be it known that I, EDWARD HART, a citizen of the United States of America, residing at Easton, in the county of Northampton and State of Pennsylvania, have invented certain new and useful Improvements in Processes of Extracting Potash Salts and other Products from Silicious Rocks, of which the following is a specification.

My invention relates to the manufacture of potash and other products resulting from the decomposition of feldspars and like rocks, the object thereof being to provide a simple, efficient and economical method which can be successfully practiced on any desired scale.

The invention consists essentially in the production of potassium salts and other commercially valuable substances by fusing orthoclase with a barium compound and carbon or other reducing agent, said carbon being usually in the form of powdered anthracite coal.

The commercial extraction of potassium from orthoclase and other silicious potassium-bearing rocks has been heretofore unsuccessful partly because the only valuable products obtained were potassium compounds in small amounts, the large amount of residue being mostly waste material. My invention, however, comprises a process of extraction by which valuable products are obtained other than potassium salts so that, as a result, the treatment of potassium bearing rocks for the extraction of their products is a successful commercial undertaking.

The addition to the silicates insoluble in acids, of one molecule of a basic oxid such as lead monoxid or barium monoxid, followed by fusion, results in the production of a silicate easily decomposed by an acid such as sulfuric, nitric, or muriatic. When treated with sulfuric acid, for example, we get lead, or barium, sulfate, and sulfate of potassium. Since such rock usually contains also aluminum in quantity, there results also aluminum sulfate. Such a solution containing sulfates of potassium and aluminum on evaporation and cooling gives crystals of common potassium aluminum alum

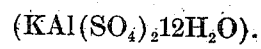
$$(KAl(SO_4)_2 12H_2O).$$

This solution may also contain sulfates of sodium, magnesium, iron, manganese, etc., which may be separated by methods known to those versed in the art. The great difficulty, however, in the commercial utilization of such methods has been the high cost of the basic oxid necessary and the production of large quantities of insoluble residue of little or no value. I have succeeded, however, in decomposing potash-feldspar or orthoclase in such a manner that all the resulting products become valuable commercially; for I have discovered that, when barium sulfate, barite or barytes ($BaSO_4$) and carbon, in the form of powdered anthracite coal for example, are mixed with powdered feldspar or other insoluble rock containing potassium or aluminum or both, and the mixture heated to fusion, a glass is obtained which when powdered is completely decomposed by mineral acids yielding a residue which may be utilized as a pigment for the manufacture of paints, or for other purposes, and a solution containing the potassium, aluminum, and other metals in soluble form capable of separation by methods well known to those versed in the art. Or, to describe the process in greater detail, when a mixture of barium sulfate, orthoclase, and carbon, or other reducing material, for example 233 parts by weight of barium sulfate, 278 parts by weight of orthoclase and 24 parts by weight of carbon or an equivalent amount of other reducing material is heated to fusion, the carbon first reduces the barium sulfate to sulfid. This takes place at a red heat as follows:

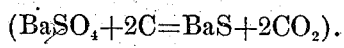
$$(BaSO_4 + 2C = BaS + 2CO_2).$$

The barium sulfid then combines with the orthoclase at a strong red heat, with production of a potassium aluminum barium silicate and expulsion of the sulfur, only a small portion of the latter remaining as barium sulfid dissolved in the resulting glass. A small portion of the potassium is volatilized but most of this condenses in the flues. The necessary maximum temperature for accomplishing these reactions probably does not exceed 1500° C. When the glass is finely pulverized and treated with a slight excess of diluted sulfuric acid at a boiling heat in leaden vessels, the proportions being for example 430 parts by weight of the glass and 310 parts by weight of oil of vitriol, the latter preferably being diluted to about half strength the glass is decomposed and there results a mixture of barium sulfate and silica insoluble in water and a sulfate of aluminum and potassium commonly called alum soluble in water. It is proposed to separate the soluble and insoluble portions by means well understood by those versed in the art and to extract from the soluble portion alum by evaporation and crystallization and use the insoluble mixture of silica and barium sulfate as a pigment in the manufacture of white or colored paint; both the ingredients of this mixture having been found specially useful for this purpose. As an example, when one molecular proportion of orthoclase or potassium aluminum silicate

(one of the feldspars), is fused with one atomic proportion of barium sulfate and two molecular proportions of powdered carbon from anthracite coal a slag or glass is formed which when powdered finely and treated with dilute sulfuric acid gives an insoluble residue consisting of silica ($SiO_2$) and barium sulfate, which when washed, dried and ground with oil makes an excellent paint; and a solution which when evaporated gives crystals of potassium aluminum alum.

Orthoclase can readily be obtained nearly free from iron and for this reason the alum obtained is of greater purity than that now made from bauxite.

It is clear that other sulfates besides barium sulfate may be used, but barium sulfate appears to be the best as it gives a pigment entirely insoluble in water as a very finely divided powder. Lead or strontium sulfates might be used but would usually be too expensive and give an inferior pigment. Sodium and potassium sulfates may also be employed but the pigment then consists entirely of silica. It is clear that ready formed sulfids such as those of barium, strontium, lead and potassium or sodium may also be used, omitting the carbon or other reducing material. It is clear also that other means may be used for decomposing the fused glass than the one suggested. Thus if hydrochloric acid were used, a mixture of the chlorids of potassium, aluminum, and barium, would result, which may be separated by means known to those versed in the art. If nitric acid were used nitrates would be formed. In both these cases the insoluble residue would be silica which is valuable commercially.

In case sulfuric acid is used the resulting mixture of barium sulfate and silica when boiled with sodium carbonate would give soluble sodium silicate and sulfate leaving insoluble barium carbonate which may be sold as such or converted into nitrate or chlorid by means of the proper acid.

The furnace to be employed may be of either the blast furnace or the reverberatory type. An electric furnace, or any other suitable kind, may, however, be employed. I am not restricted to any particular construction of furnace, and the details thereof may vary widely. The materials when placed in the furnace will commonly be in a crushed state, preferably, though not necessarily, crushed to a size which will pass a sieve having 100 meshes to the inch. The carbon is ordinarily used in the form of pulverized or powdered anthracite coal.

Having thus described my invention, what I claim as new and desire to secure by Letters Patent, is:

1. The process of treating insoluble potassium bearing rocks comprising fusing said rock in the presence of barium sulfid, pulverizing the glass thus obtained, treating it with a mineral acid and separating the soluble constituents of the product thus formed from the insoluble constituents thereof, substantially as described and specified.

2. The process of treating insoluble potassium bearing rocks comprising fusing said rock with barium sulfate and a reducing agent, pulverizing the glass thus obtained, treating it with sulfuric acid and separating the soluble constituents of the product thus formed from the insoluble constituents thereof, substantially as described and specified.

3. The process of treating orthoclase feldspar comprising fusing said feldspar in the presence of barium sulfid, thus producing a potassium aluminum barium glass, pulverizing said glass, treating it with sulfuric acid and separating the soluble constituents of the product thus formed including salts containing potassium from the insoluble constituents thereof including silica and barium sulfate, substantially as described and specified.

4. The process of treating orthoclase feldspar comprising fusing one molecular proportion thereof with one molecular proportion of barium sulfate and two atomic proportions of powdered carbon, pulverizing the glass thus obtained, treating it with sulfuric acid and separating the soluble constituents of the product thus formed, including potassium aluminum alum from the insoluble constituents, including silica and barium sulfate, substantially as described and specified.

In testimony whereof I affix my signature in presence of two witnesses.

EDWARD HART.

Witnesses:
HENRY McKEEN, Jr.,
H. SHERWOOD YOUNG.